United States Patent [19]

Baba

[11] Patent Number: 4,833,640

[45] Date of Patent: May 23, 1989

[54] REGISTER BANK CHANGE INCLUDING REGISTER TO REGISTER TRANSFER IN A DATA PROCESSING SYSTEM

[75] Inventor: Shiro Baba, Tokorozawa, Japan

[73] Assignee: Hitachi, Ltd., Tokyo, Japan

[21] Appl. No.: 922,672

[22] Filed: Oct. 24, 1986

[30] Foreign Application Priority Data

Oct. 25, 1985 [JP] Japan .............................. 60-237358

[51] Int. Cl.$^4$ .............................................. G06F 9/46
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,373,408 | 3/1968 | Ling | 364/200 |
| 4,530,047 | 7/1985 | Rogers et al. | 364/200 |
| 4,532,587 | 7/1985 | Roskell et al. | 364/200 |
| 4,589,065 | 5/1986 | Auslander et al. | 364/200 |

OTHER PUBLICATIONS

"A VLSI RISC", D. A. Patterson and C. H. Sequin, Computer, Sep. 1982, pp. 8–21.
"RISC I: A Reduced Instruction Set VLSI Computer", D. A. Patterson and C. H. Sequin, IEEE Proceedings of the Eighth Annual Symposium on Computer Architecture, May 1981, pp. 443–457.
"Computers, Complexity and Controversy", R. P. Colwell et al., Computer, Sep. 1985, pp. 8–19.

Primary Examiner—Gareth D. Shaw
Assistant Examiner—Maria Napiorkowski
Attorney, Agent, or Firm—Antonelli, Terry & Wands

[57] ABSTRACT

The data processing system has a data processing function to perform a data processing by specifying one of a plurality of register groups according to an instruction. The instruction contains information for indicating a change from one register group to another register group and information for specifying a desired one or two or more registers in said register group. This makes it possible to transfer the contents of the desired one or two or more registers to other registers at the time of a register change.

10 Claims, 8 Drawing Sheets

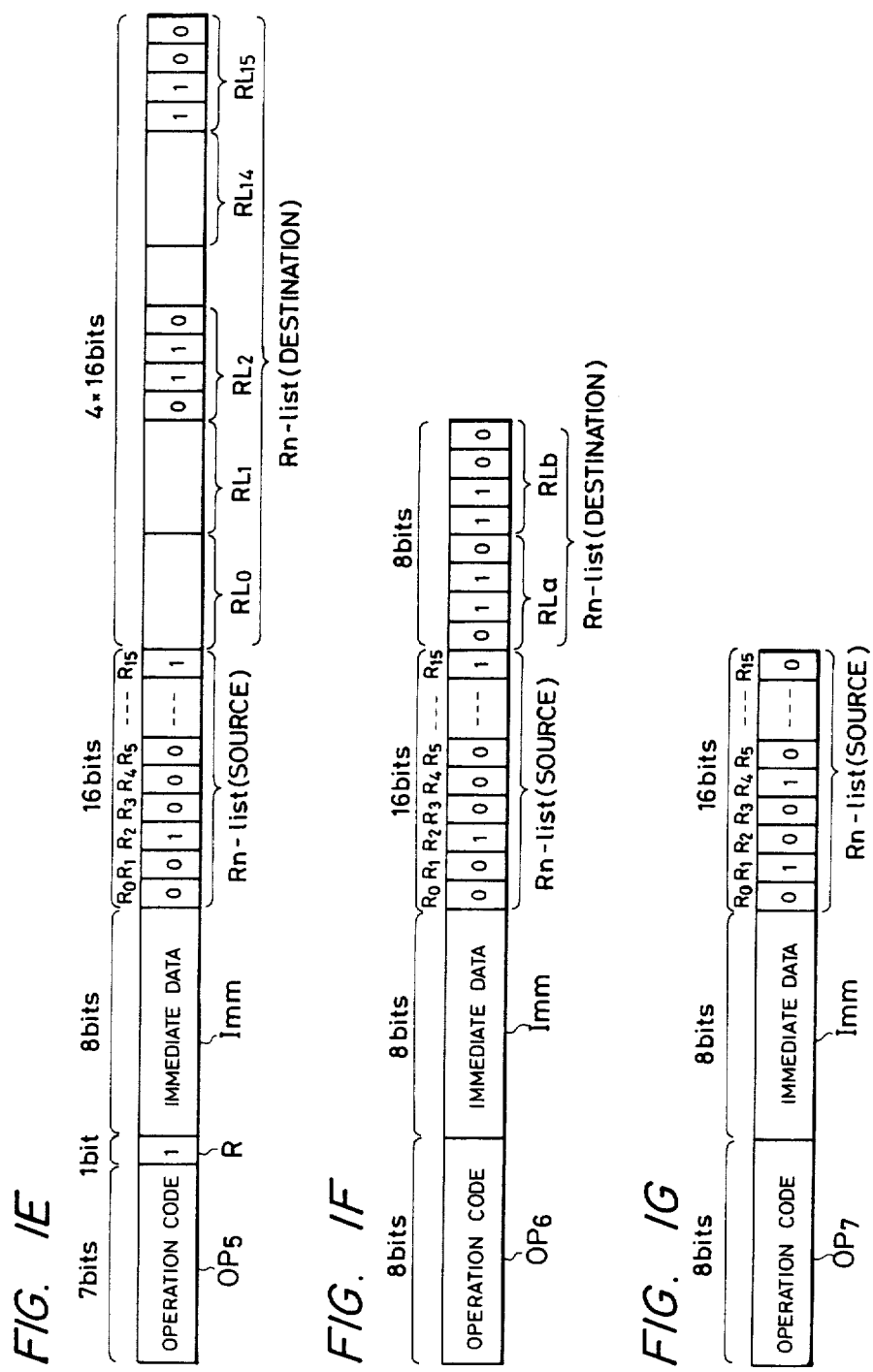

REGISTER BANK CHANGE INCLUDING REGISTER TO REGISTER TRANSFER IN A DATA PROCESSING SYSTEM

BACKGROUND OF THE INVENTION

The present invention relates to a data processing technology, and in particular, to a technology effectively applicable to an instruction system in a program controlled system, for example, to an instruction system of a microprocessor having at least two register sets.

In the past, in some microcomputers of the Z80 type (Zylog), as shown in FIG. 7, two register sets RSA and RSB are provided so that a task processing can be achieved by use of one of these register sets. According to this operation, for example, when a task is completed by use of the register set RSA, control can be immediately passed to another task processing by changing from the register set RSA to the register set RSB with the contents of the registers remaining unchanged. To return control to the original task when the task processing is completed, the register set is changed to the register set RSA, which enables use of the remaining contents of the registers associated with the original task to be executed. Consequently, this method has the advantages that certain operations, such as an operation to save registers, are not necessary when a task is changed and that a high execution speed can be developed.

However, there exist some cases where an argument is required to be transferred to execute a new processing when control is passed from one task processing to another task processing. As shown in FIG. 7, if the system is so controlled to completely change the register set, there arises a disadvanage that the argument cannot be easily transferred.

In contrast, the reduced instruction set computer (RISC) produced by the UC at Berkeley is provided with a plurality of register sets RSA, RSB, RSC, etc. in which a fixed number of registers in the respective sets overlaps, as shown in FIG. 8. As a result, operations, such as a transfer of arguments, can be easily accomplished when control jumps to a subroutine. However, when a plurality of register sets in the respective groups overlap with each other, the overlapping registers cannot be used in a case where such operations as a transfer of arguments is not required when a task change takes place, which therefore leads to a disadvantage that the available number of registers is limited.

SUMMARY OF THE INVENTION

It is therefore an object of the present invention to provide a data processing system which increases the flexibility available at the time of change of a plurality of register sets, thereby improving the execution speed of the data processing system.

These and other objects and novel features of the present invention will become apparent from the following description taken in conjunction with the accompanying drawings.

The representative features of the invention disclosed by the present application will be as follows.

That is, in a data processing system having a plurality of register sets, a new instruction is provided which passes the content of a register, which is specified when a register set is changed, to a register in another register set, and this transfer operation is implemented by hardware. This allows operations in which a register set is changed with or without a transfer of an argument or the like. As a result, a high-speed task change and subroutine call can be effected, and hence the above-mentioned object can be achieved, namely, the flexibility in a change of the register set is improved and the execution speed of the system is improved.

BRIEF DESCRIPTION OF THE DRAWINGS

The present invention will be apparent from the following detailed description taken in conjunction with the accompanying diagrams in which:

FIGS. 1A-1G are schematic diagrams illustrating examples of formats of register set change instructions according to the present invention;

DESCRIPTION OF THE PREFERRED EMBODIMENTS

FIGS. 1A-1G are schematic diagrams illustrating examples of formats of register set change instructions according to the present invention.

Figures 1A, 1B, 1C, 1D:
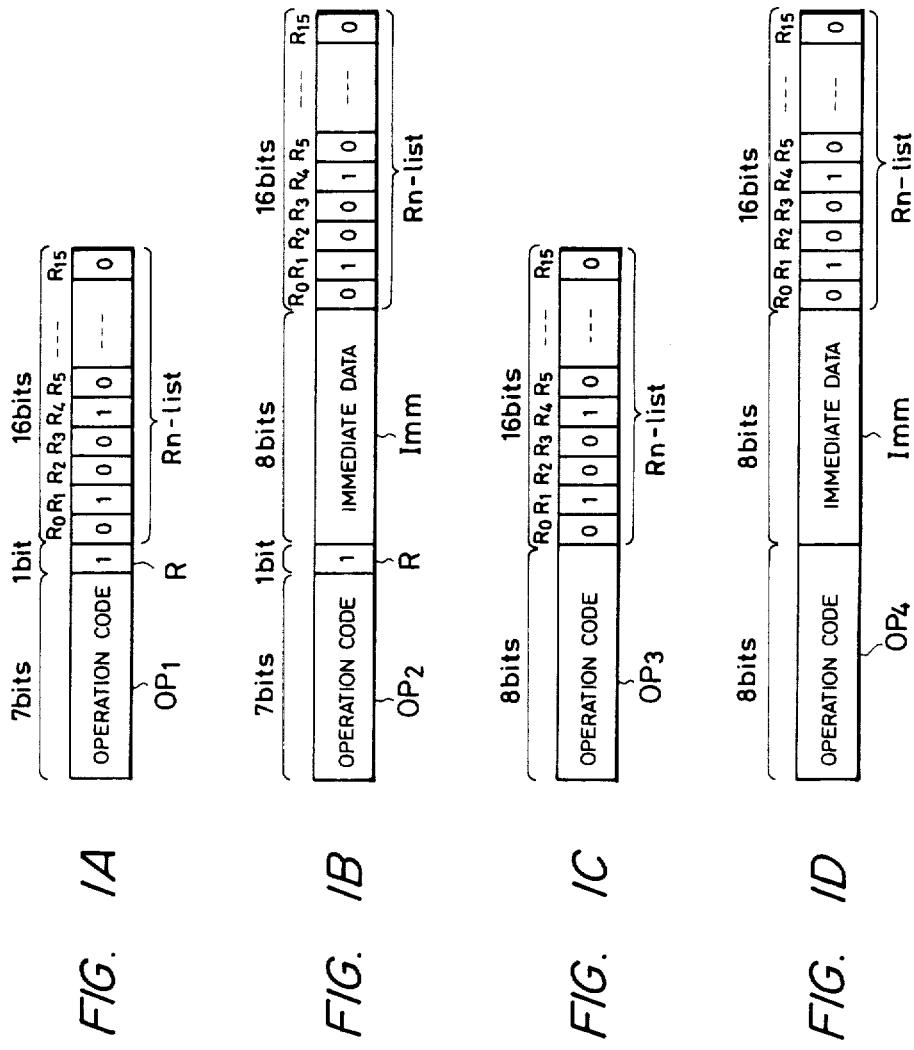

The format shown in FIG. 1A is a format suitable for an instruction which is used to change a register set (to be referred to as a register bank herebelow) to an adjacent register bank among a plurality of register banks. An operation code specify field $OP_1$ contains a code used for incrementing or decrementing a register bank number. A field R following the operation code specify field $OP_1$ is provided to indicate whether or not a transfer of the register content has been achieved and is constituted from one bit. If this field R is set to "0", when a register bank (for example, $BN_1$) is changed to the immediately preceding or following register bank $BN_{i-1}$ or $BN_{i+1}$, respectively, the bank is changed without transferring the contents of any registers in the register bank $BN_i$.

On the other hand, if the field R is set to "1", for the registers specified by the register specify field Rn-list following the field R, the contents thereof are indicated to be transferred to the corresponding registers of the register bank $BN_{i-}$ or $BN_{i+1}$ after the register bank is changed.

Moreover, in this embodiment, it is assumed that each register bank comprises 16 registers, that the register specify field Rn-list is constituted from 16 bits, and that a register to which the content is to be transferred can be specified according to the bit correspondence. For example, in the example of FIG. 1A, it is indicated that the contents of the first and fourth registers $R_1$ and $R_4$, respectively, in the register bank in use are to be passed to the first and fourth registers in a register destination bank after the change.

Figure 3A:
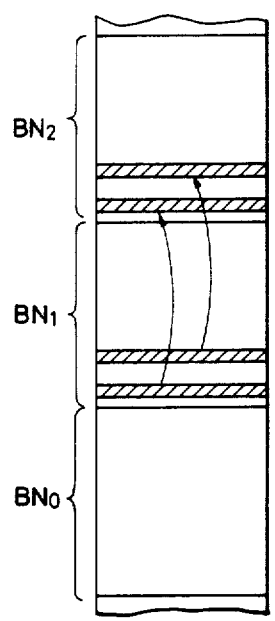
FIGS. 3A-3D are explanatory diagrams illustrating operations of register set change instructions according to the present invention.

FIG. 3A is a diagram showing a case where by using this instruction, the register bank is changed (incremented) from $BN_1$ to $BN_2$. However, in this case, an instruction (represented as IBNR) is used to increment the bank number. To restore the register bank from $BN_2$ to $BN_1$, an instruction (represented as DBNR) to decrement the bank number need only be used, where the field R and the register specify field Rn-list need only be set as described above.

Next, an instruction format shown in FIG. 1B will be described. This format is suitable for an instruction (represented as CBNR) which changes the register bank in use to a register bank at a location separated therefrom (i.e. not adjacent thereto).

Figure 3B:
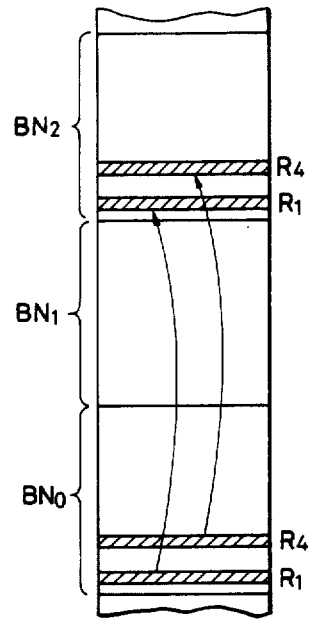

This CBNR instruction is so structured to have an immediate data specify field Imm to specify a register bank number of the change destination between the field R and the register specify field Rn-list of the instruction format of FIG. 1A. With this CBNR instruction, the register bank is changed, for example, from $BN_0$ to $BN_2$. Furthermore, in this operation, by specifying arbitrary registers in the bank, for example, registers $R_1$ and $R_4$ as shown in FIG. 3B, the register bank can be changed with or without a transfer of the contents of the registers. The presence or absence of the register transfer is determined by information in the field R, whereas the content of the instruction is determined by information in the operation specify field $OP_2$.

Although not essential, in this embodiment, the immediate data specify field Imm is set to have a length of eight bits due to the relationships with respect to the operation word length. As a result, up to 256 register banks can be handled.

In addition, when a register bank change is achieved with a CBNR instruction, the operation to return to the original register bank will be facilitated if the original register bank number before the change is saved in a stack area or the like. Consequently, in such a case, with an instruction (represented as PBNR) having a format identical to the format shown in FIG. 1A, the original register bank number is fetched from the stack number, which makes it possible to restore the original register bank without using the CBNR instruction described above.

Next, the instruction format shown in FIG. 1C will be described. This format comprises an operation code specify field $OP_3$ and a register specify field Rn-list. A field R dedicated to indicate whether or not a transfer of the register content takes place is not provided. The information related to the presence or absence of the transfer of the register content is contained in the operation specify field $OP_3$. Although not essential, the operation code specify field $OP_3$ is constituted from eight bits. When this instruction is executed, the register set is changed as shown in FIG. 3A.

Next, the instruction format shown in FIG. 1D will be described. This format comprises an operation code specify field $OP_4$, an immediate data specify field Imm, and a register specify field Rn-list. A field R dedicated to indicate whether or not the transfer of the register content takes place is not provided. The information related to the presence or absence of the transfer of the register content is contained in the operation specify field $OP_4$. When this instruction is executed, a change of the register set is accomplished as shown in FIG. 3B.

Figure 3C:
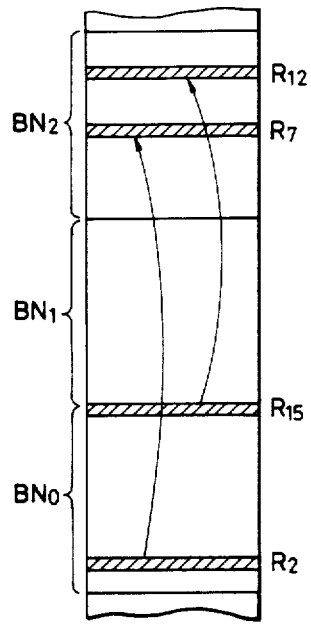

Next, the instruction format shown in FIG. 1E will be described. This format comprises an operation code specify field $OP_5$, a transfer presence/absence specify field R, an immediate data specify field Imm, a transfer source register specify field Rn-list (source), and a transfer destination register specify field Rn-list (destination). The transfer destination register specify field Rn-list (destination) is divided into 16 fields $RL_0$-$RL_{15}$ corresponding to the number of registers in the register bank. To each field of the fields $RL_0$-$RL_{15}$, an area for four bits is allocated to indicate a register number of the transfer destination. For example, the field $RL_2$ specifies the seventh register, namely, register $R_7$ in the transfer destination register bank. Furthermore, the field $RL_{15}$ specifies the 12th register, namely, register $RL_{12}$ in the transfer destination register bank. FIG. 3C is a diagram illustrating an example of a case where the register bank is changed according to the instruction shown in FIG. 1E. Among the registers in the register bank $BN_0$, the registers $R_2$ and $R_{15}$ to be transferred are specified by the information in the transfer source register specify field Rn-list (source). The bank number $BN_2$ of the register bank after the change is specified by the information in the immediate data specify field Imm. By using th instruction format shown in FIG. 1E, a transfer between arbitrary registers becomes possible between arbitrary register banks.

Next the instruction format shown in FIG. 1F will be described. This format comprises an operation code specify field $OP_6$, an immediate data specify field Imm. a transfer source register specify field Rn-list (source), and a transfer destination register specify field Rn-list (destination). Unlike the format shown in FIG. 1E, the transfer destination register specify field Rn-list is divided into two fields RLa and RLb. To each field of the fields RLa and RLb, four bits are allocated to specify a register number in the register bank after the change. This instruction format is especially effective in a case where the number of the registers from which data is to be transferred is limited to two or less. This is because the total bit length of the instruction format can be minimized. For example, the transfer destination register specify field Rn-list (destination) of FIG. 1E is constituted from 64 bits; whereas, the transfer destination register specify field Rn-list (destination) of FIG. 1F can be constituted from only eight bits. Moreover, in the format of FIG. 1F, information to establish a correspondence between a transfer source register number and a transfer destination register number is required to be included in the operation specify field $OP_6$. That is, the correspondence is established such that the transfer destination of the register $R_2$ specified by the transfer source register specify field Rn-list (source) is specified by the field RLa and the transfer destination of the register $R_{15}$ is specified by the register RLb. FIG. 3C shows an example of a case where the register bank is changed according to an instruction shown in FIG. 1F.

Figure 3D:
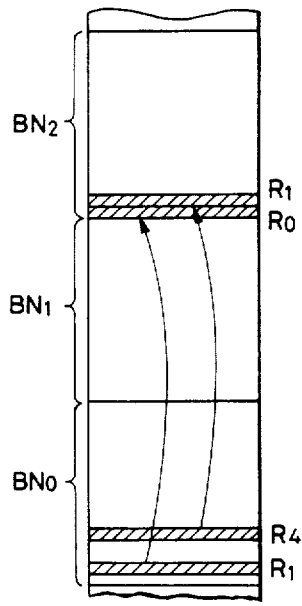

Next, the instruction format shown in FIG. 1G will be described. This format comprises an operation code specify field $OP_7$, an imemdiate data specify field Imm, and a transfer source register specify field Rn-list (source). FIG. 3D shows an example of a case where the register bank is changed according to the instruction shown in FIG. 1G. In this instruction format, the transfer destination specify field is not provided. If there exist registers to be transferred when the register bank is changed, the registers are specified beginning from the register $R_0$ having the smallest register bank number in the new register bank $BN_2$. Such a specify sequence is determined by the information in the operation code specify field $OP_7$.

Figure 4:
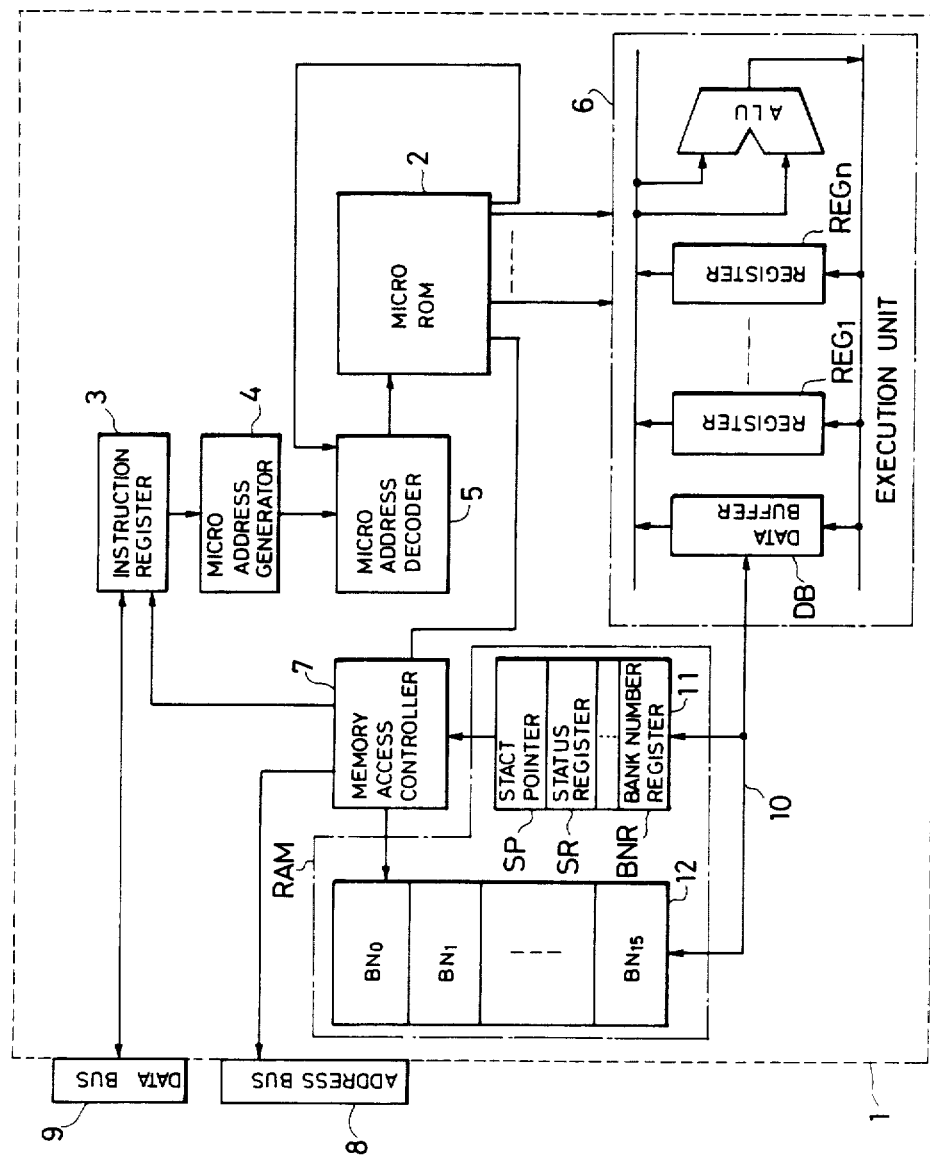
FIGS. 4-6 are schematic block diagrams showing examples of a microprocessor configuration which enable execution of register set change instructions according to the present invention.

Referring now to FIG. 4, a description will be given of an example of a hardware configuration of a microprocessor which enables an execution of a register bank change instruction configured in the format described above.

The microprocessor of this embodiment is provided with a control section of the microprogram controlled system. That is, an LSI chip constituting the microprocessor includes a micro read only memory (ROM) 2 in which a microprogram is stored. The micro ROM 2 is accessed by use of a micro address decoder 5 so as to sequentially read the microinstructions constituting the microprogram.

An address generated by a micro address generate circuit 4 based on an operation code of a macro instruction fetched into an instruction register 3 is supplied to the micro address decoder 5. By decoding the address, the first instruction of a group of microinstructions for executing the macro instruction is read and then the control signals are generated for the components such as an execution unit 6 comprising various temporary registers $REG_1$-$REG_n$, a data buffer DB, an arithmetic logic unit ALU, and the like. Among the group of microinstructions associated with the macro instruction, the second and subsequent microinstructions are read, when a code of the next address field of the microinstruction previously read is supplied to the micro address decoder 5, based on the next address of the previous microinstruction and the address from the micro address generate circuit 4. With the control signals generated after a series of micro instructions are read, the execution unit 6 is controlled and, for example, a macro instruction such as an add instruction represented by ADD is executed.

Figure 2:
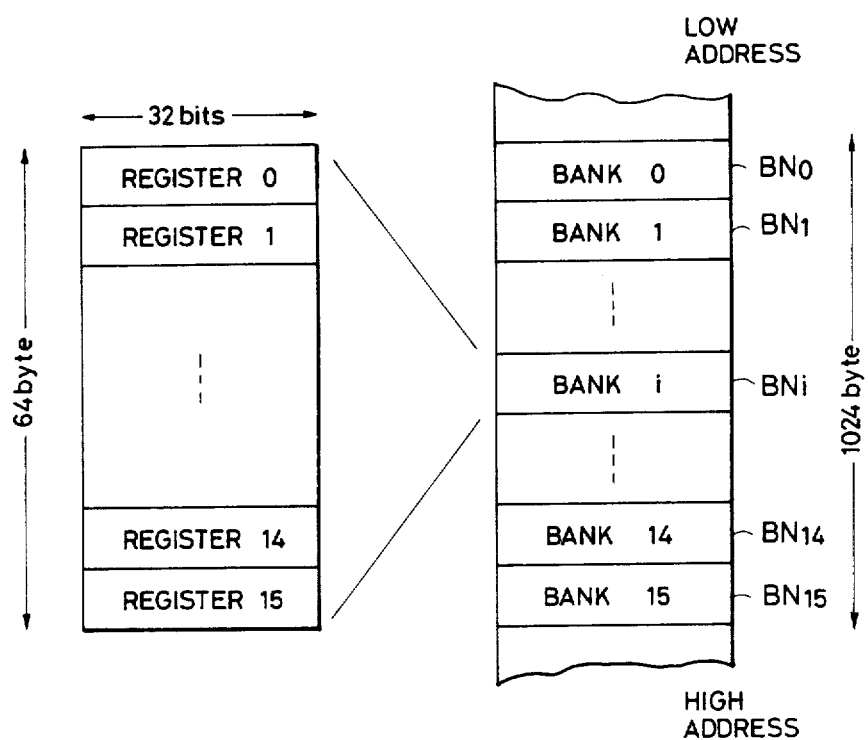
FIG. 2 is a schematic diagram depicting the example of a configuration of a register bank in FIGS. 4-7.

In this embodiment, there is provided a memory access control circuit 7 having a function to control a group of general purpose registers 12 including 16 register banks $BN_0$-$BN_{15}$ and a group of control registers 11. The 16 register banks $BN_0$-$BN_{15}$ each comprise 32-bit regiseters 0-15, for example, as shown in FIG. 2. The control register is provided with a status register SR, a stack pointer SP, and a bank number register BNR keeping the register bank number currently in use. In this embodiment, the group of general-purpose registers 12 including the register banks $BN_0$-$BN_{15}$ and the group of control registers 11 are constituted from a random access memory (RAM), which is connected via an internal bus 10 to a data buffer DB in the execution unit 6.

Moreover, the instruction register 3 comprises a first-in first-out (FIFO) memory. A macro instruction stored in an external memory is read on a byte-by-byte basis when the memory access control circuit 7 accesses an address bus 8 and then the macro instruction is supplied via the data bus 9 to the instruction register 3 comprising a FIFO memory. In this manner, a plurality of operation codes and operands are fetched into the instruction register in advance.

As described above, in the microprocessor of this embodiment, each task can be processed by use of one of the 16 register banks $BN_0$-$BN_{15}$.

When a register bank change instruction IBNR or DBNR shown in FIG. 1A is stored in the isntruction register 3 of the microprocessor, a corresponding micro instruction is read from the micro ROM2. The memory access control circuit 7 is controlled by the microcode, for example, if the register bank being used by the memory access control circuit 7 up to the point is $BN_i$, the change is performed to effect the subsequent processing by use of $BN_{i+1}$ or $BN_{i-1}$. If the bit of the field R is "1", for the registers specified by Rn-list, a processing is achieved in which the contents of the registers are moved to the corresponding registers in another bank or to the registers particularly specified therefor. Moreover, the bank number in the bank number register BNR is changed.

On the other hand, when a corresponding micro instruction is read after a register bank change instruction CBNR such as shown in FIG. 1B is stored in the instruction register 3, the register bank number specified by the immediate data specify field Imm is written in the bank number register BNR and hence the bank number is changed. At the same time, the specified registers are transferred. Moreover, the bank number in use contained in the bank number register BNR up to the point is stored together with the content of the program counter and the like in a stack area of the external memory.

When the register bank change instruction PBNR is loaded, the saved original register number is read from the stack area specified by a stack pointer in the control register group 11 and is loaded into the bank register BNR, and at the same time, the bank in use in the general-purpose register group 12 is changed and the necessary contents of registers are transferred.

Consequently, by use of the instruction CBNR described above, at a subroutine call for example, another task processing can be executed by effecting a jump from the main routine to a subroutine with a transfer of data such as arguments; moreover, by use of the PBNR instruction, control can be rapidly returned to the original position of the main routine, thereby continuing the original processing.

Figure 5:
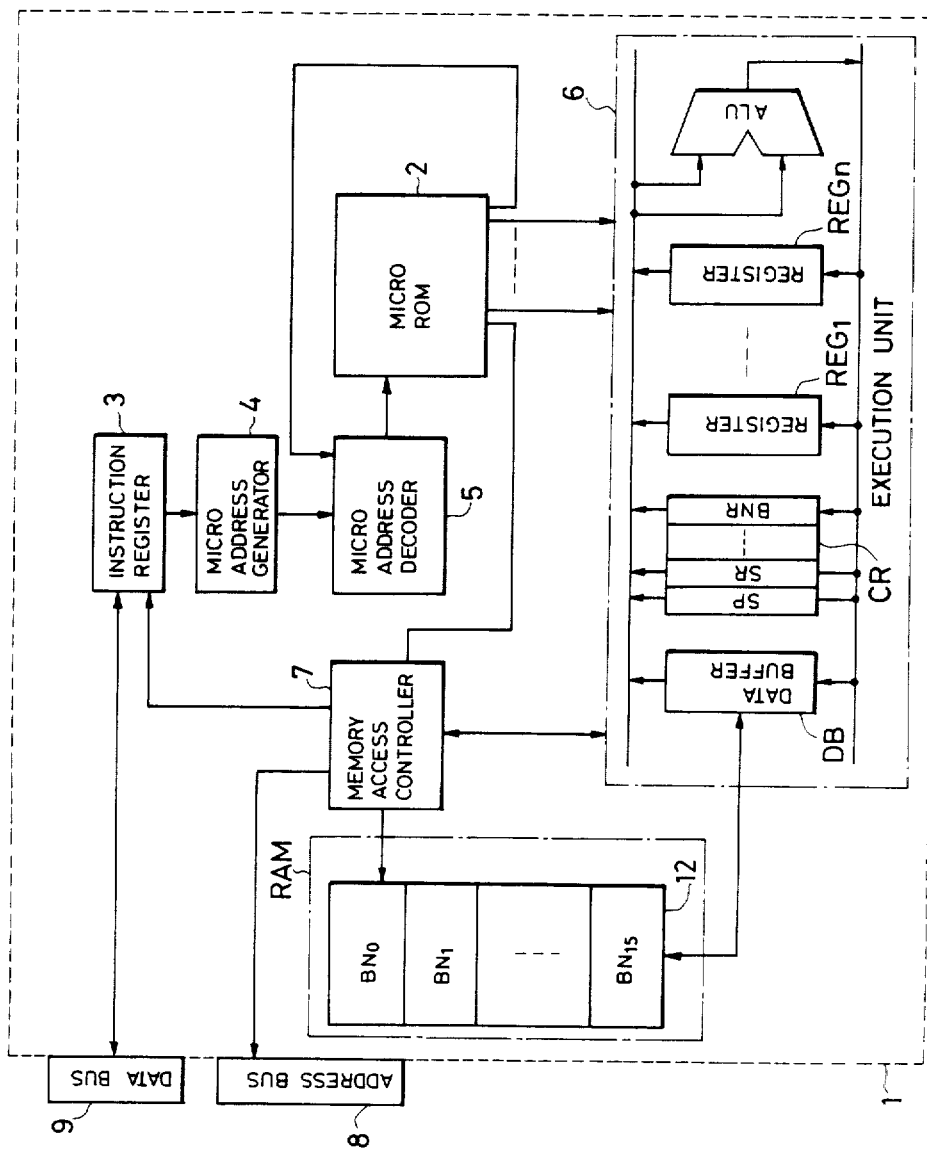

FIG. 5 is a schematic diagram showing another example of a microprocessor which enables an execution of a register bank change instruction according to the present invention. The difference, when compared with the microprocessor shown in FIG. 4, is in the configuration of the control register group. The control register group 11 is disposed in the RAM in FIG. 4, whereas the control group of FIG. 5 is constituted from a plurality of registers as dedicated store means. Like the temporary registers $REG_1$-$REG_n$ in the same type of configuration, these registers may be disposed in the execution unit 6.

Figure 6:
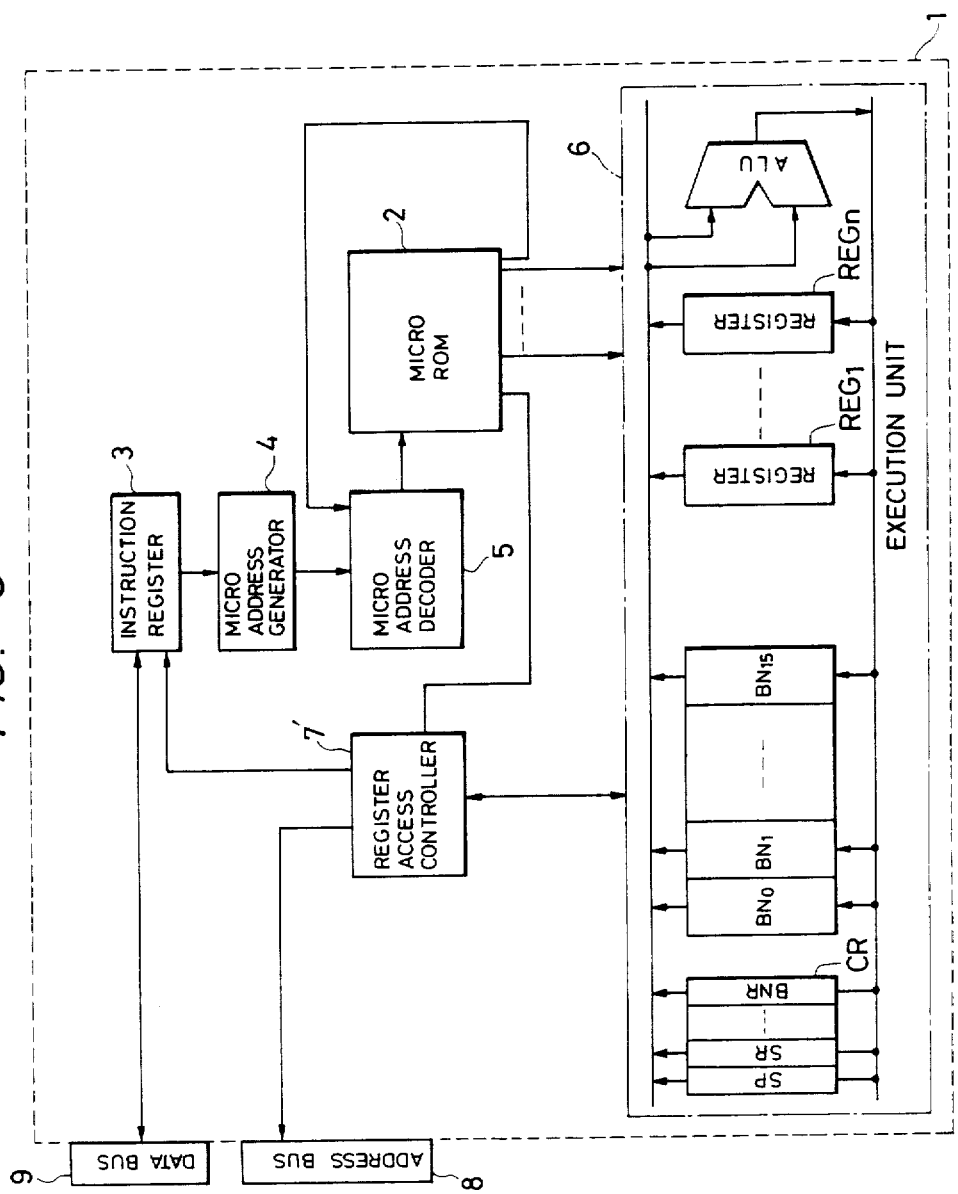
Figure 7:
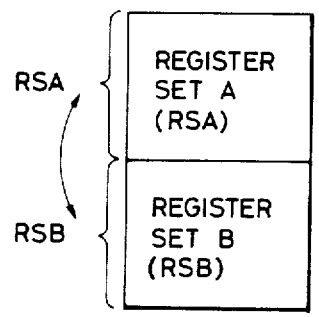
FIGS. 7-8 are explanatory diagrams illustrating register change procedures in the conventional microprocessor.
Figure 8:
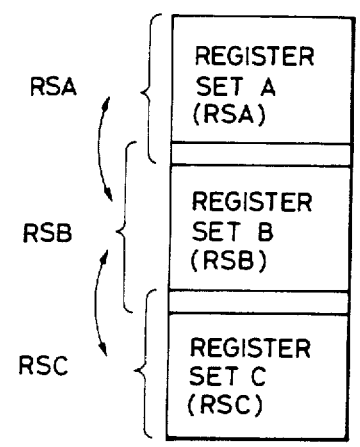

FIG. 6 is a diagram illustrating another example of a microprocessor which enables an execution of a register bank change instruction according to the present invention. The difference, when compared with the microprocessor of FIG. 5, is in the configuration of the register banks $BN_0$-$BN_{15}$. The register banks $BN_0$-$BN_{15}$ are disposed in the RAM in FIG. 5, whereas the register banks $BN_0$-$BN_{15}$ of FIG. 6 are constituted from a plurality of registers as dedicated store means. Like the temporary registers $REG_1$-$REG_n$ in the same type of configuration, these registers may be disposed in the execution unit 6. By disposing the register banks $BN_0$-$BN_{15}$ in the execution unit 6, the data buffer DB for keeping the contents of the register banks $BN_0$-$BN_{15}$ need not be disposed in the execution unit 6. Moreover, a register access controller 7' is disposed in place of the memory access controller 7.

In addition, the register bank change instruction proposed by the present invention is not limited to the formats of FIGS. 1A - 1G, for example, the field lengths of the register specify field Rn-list and the immediate data specify field Imm can be naturally altered according to the capacity of the RAM (12) as the general -purpose register group and the number of registers of each register bank $BN_i$.

According to the present invention, a microprocessor having a plurality of register sets is provided with a new instruction used with a register specification for changing a register set to transfer the content of the register to a register in another register set, and hence a change of a register set can be achieved with or without a transfer of data such as arguments. This enables to effect a high-speed task change and subroutine call, which leads to an effect that the flexibility in the register set change is improved and the execution speed of the system is increased.

While the invention of the present inventor has been concretely described with reference to the particular embodiments, it is not to be restricted by those embodiments but only by the appended claims. It is to be appreciated that those skilled in the art can change or modify the embodiments without departing from the scope and spirit of the present invention. For example, the register banks $BN_0$-$BN_{15}$ may be so configured to be disposed externally with respect to the microprocessor 1. Moreover, in the description above, although the invention of the present inventor has been described in a case where the invention is applied to a microprocessor, namely, a utilization field which is the background of the invention, it is not restricted by the utilization field, that is, the present invention can be used for a program controlled data processing system in general such as a computer and a mini-computer.

What is claimed is:

1. A data processing system comprising:
   data processing means, including a plurality of register groups for storing data related to respective processing tasks and means for specifying one register group of said plurality of register groups, for effecting a predetermined data processing involving the contents of said specified one of said plurality of register groups according to an instruction, and having means for changing the register groups specified by said specifying means in response to a register change instruction which includes information for indicating to said data processing means a change in the specified register group from one register group to another register group for effecting said predetermined data processing and information for specifying at least one register among registers of said one register group from which the contents are to be transferred to said another register group; and
   means for transferring contents of said specified one register to a register in said another register group in response to said register change instruction.

2. A data processing system according to claim 1, wherein said register change instruction further includes information for specifying said register in said another register group into which the contents of said one register are to be transferred.

3. A data processing system according to claim 1, wherein said information in said register change instruction indicating a change in the specified register group from one register group to another register group includes an operation code portion and a register group designation portion.

4. A data processing system according to claim 1, wherein said information in said register change instruction indicating a change in the specified register group from one register group to another register group includes an operation code portion and an indication as to whether the contents of any of the registers of said one register group are to be transferred to another register group.

5. A data processing system, comprising:
   instruction register means for storing at least one instruction;
   a plurality of register groups for storing data related to respective processing tasks;
   specifying means for specifying a single one of said register groups;
   processing means, coupled to said plurality of register groups and responsive to an instruction stored in said instruction register means, for effecting a processing of a task involving data stored in said register group specified by said specifying means;
   means responsive to a first portion of a register change instruction for effecting a change in said register group specified by said specifying means from one register group to another register group for processing a task; and
   means responsive to a second portion of said register change instruction specifying at least one register in said one register group for transferring the contents of said specified one register to said other register group.

6. A data processing system according to claim 5, wherein said processing means further includes means responsive to a third portion of said register change instruction specifying a register in said other register group for transferring the contents of the register of said one register group into the register of said other register group specified by said third portion of said register change instruction.

7. A method of controlling processing of tasks in a data processing system having a plurality of register groups for respectively storing information related to respective tasks, in response to a register change instruction, comprising the steps of:
   (a) processing a first task in conjunction with information stored in one register group;
   (b) indicating in response to a first portion of said register change instruction a change of register group from said one register group to a designated register group for processing a second task;
   (c) specifying in response to a second portion of said register change instruction at least one register in said one register group from which information is to be transferred to said designated register group to process said second task; and
   (d) transferring information from said specified register to said designated register group.

8. A method according to claim 7, further including the step of:
   (e) specifying in response to a third portion of said register change instruction a register in said designated register group into which information is to be transferred from said one register group, and transferring said information between specified registers in said step (d).

9. A method according to claim 7, wherein said second portion of said register change instruction includes a number of bits corresponding respectively to the register in a register group with each bit indicating by its state whether the contents of the corresponding register are to be transferred.

10. A method according to claim 7, wherein said first portion of said register change instruction includes an operation code and a register group designation portion.

* * * * *